(12) United States Patent
Hori (10) Patent No.: US 6,414,778 B1
(45) Date of Patent: Jul. 2, 2002

(54) SYNCHRONIZING SIGNAL DETECTING METHOD AND DEVICE FOR MULTI-BEAM SCANNING DEVICE

(75) Inventor: Nobuyuki Hori, Saitama-ken (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/627,117

(22) Filed: Jul. 27, 2000

(30) Foreign Application Priority Data

Jul. 29, 1999 (JP) .......................................... 11-214673

(51) Int. Cl.[7] .............................................. G02B 26/08
(52) U.S. Cl. ....................... 359/204; 359/212; 359/216; 347/238; 347/243; 250/234
(58) Field of Search ......................... 359/204, 216–219, 359/900; 347/233–237, 243; 250/234–236

(56) References Cited

U.S. PATENT DOCUMENTS 5,834,766 A  * 11/1998 Suhara ........................ 359/204

FOREIGN PATENT DOCUMENTS

JP          8-164632         6/1996

* cited by examiner

Primary Examiner—James Phan
(74) Attorney, Agent, or Firm—Greenblum & Bernstein, P.L.C.

(57) ABSTRACT

A multi-beam scanning device is provided with a plurality of light sources that emit a plurality of light beams, respectively, a scanning system that deflects each of the plurality of light beams to scan within a predetermined scanning range, a modulating system that modulates the plurality of light beams at a plurality of frequencies, respectively, and a beam detector positioned with in the scanning range to receive the plurality of light beams respectively modulated at different frequencies. The beam detector outputs a signal representing intensity of received light beams. A separating system is provided to separate the output signal of the beam detector, on a basis of the plurality of frequencies, into a plurality of component signals, and a synchronizing signal generating circuit that generates a plurality of synchronizing signals respectively corresponding to the plurality of light beams based on the plurality of component signals.

10 Claims, 8 Drawing Sheets

SYNCHRONIZING SIGNAL DETECTING METHOD AND DEVICE FOR MULTI-BEAM SCANNING DEVICE

BACKGROUND OF THE INVENTION

The present invention relates to a multi-beam scanning device, and particularly to a synchronizing signal detecting method and device for the multi-beam scanning device.

In recent imaging apparatuses, such as a laser beam printer, there are ones employing a scanning device, which is provided with a plurality of laser diodes. In such a printer, by emitting a plurality of laser beam, which are modulated respectively, a plurality of line images are formed on a surface to be scanned, such as a photoconductive surface, simultaneously, thereby image forming speed becomes faster. Such a scanning device using a plurality of beams will be referred to as a multi-beam scanning device. In order to adjust the timing of drawing start position from which a scanning line is formed by each laser beam, a horizontal synchronizing signal should be detected for each laser beam.

Figure 9A:
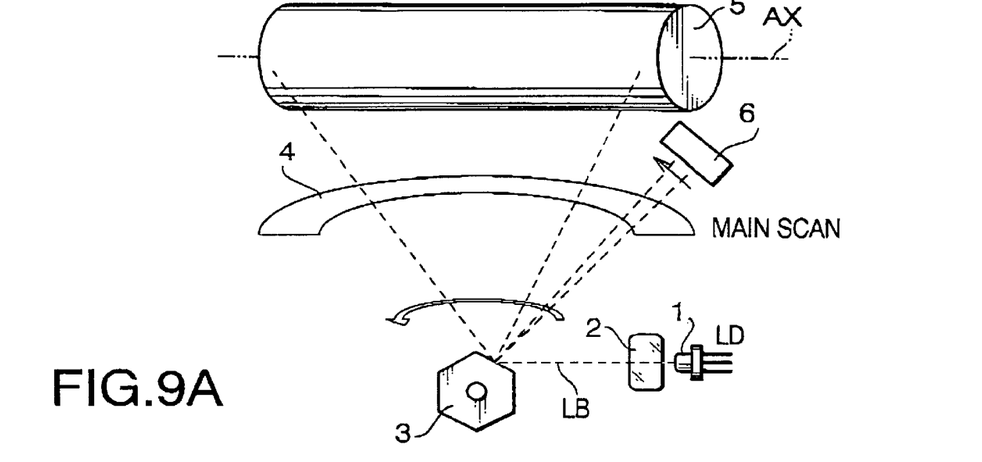
FIGS. 9A, 9B, 9C and 9D show conventional single beam scanning device, and principle of generating a horizontal synchronizing signal.

In a conventional scanning device using a single laser beam, a beam detector as shown in FIG. 9A is employed.

FIG. 9A schematically shows a structure of the conventional scanning device using a single layer beam.

In FIG. 9A, a laser diode 1 emits a diverging laser beam, which is collimated by a collimating lens 2. The collimated laser beam is incident on a polygonal mirror 3, which is rotated at a high speed. The laser beam incident on reflection surface of the polygonal mirror 3 is deflected thereby to scan within a predetermined angular range. The deflected (i.e., scanning) beam passes through an fθ lens 4 and is converged, in a direction perpendicular to the scanning direction, thereby so that a scanning beam spot is formed on a photoconductive drum 5. It should be noted that the photoconductive drum 5 is rotatable about an axis AX (see FIG. 9A) thereof, and the beam spot formed on the photoconductive drum moves, at a constant speed due to the function of the fθ lens on the circumferential surface thereof in a direction parallel to the axis thereof. The direction in which the beam spot moves will be reflected to as an main scanning direction hereinafter. While the main scanning is performed, the photoconductive drum is rotated. The direction in which the circumferential surface moves with respect to the main scanning line (i.e., the direction perpendicular to the main scanning direction) will be referred to as an auxiliary scanning direction.

Within a scanning range of the laser beam, but outside a range contributing to the image formation, a beam detector 6 is provided. The beam detector 6 outputs a detection signal when the scanning beam is incident on the beam detector 6. The output of the beam detector 6 is used for generating a horizontal synchronizing signal.

Figure 9B:
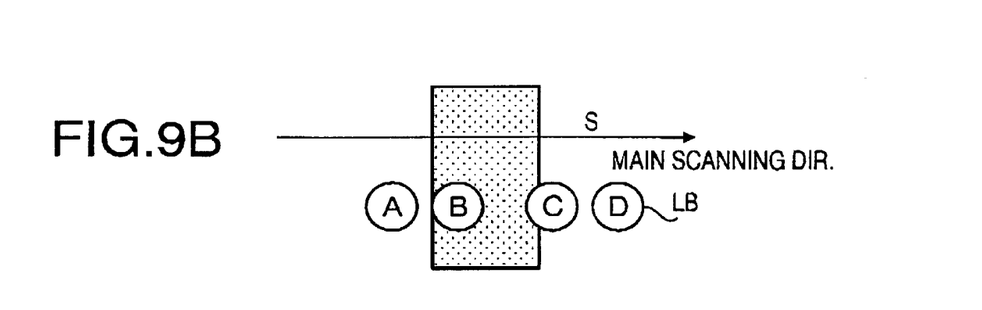

FIG. 9B illustrates a light receiving surface of the beam detector 6, and a beam spot at various positions.

Figures 9C, 9D:
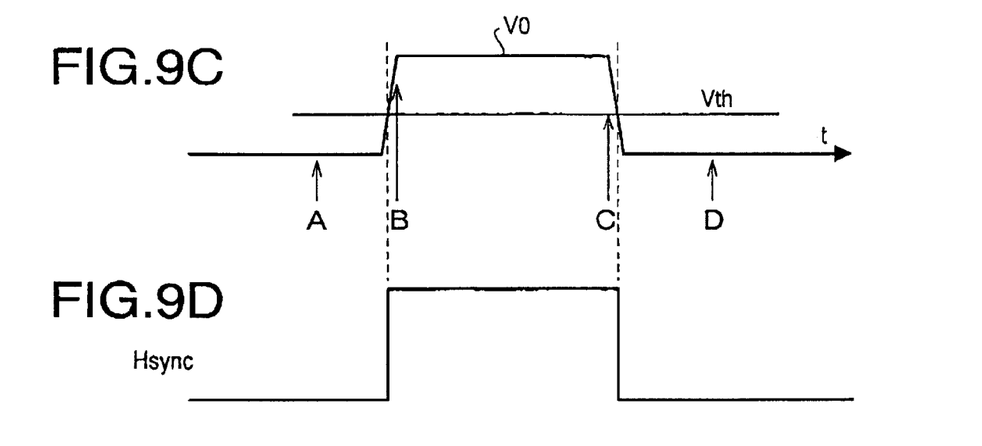

If the diameter of the beam spot in the main scanning direction on a plane including the light receiving surface of the beam detector 6 is smaller than the width of the light receiving surface of the beam detector 6 as shown in FIG. 9B, then when the laser beam traverses the light receiving surface of the beam detector 6, the output voltage VO varies as shown in FIG. 9C. By comparing the output voltage VO with a predetermined threshold value Vth, a horizontal synchronizing signal as shown in FIG. 9D is obtained.

Figure 10A:
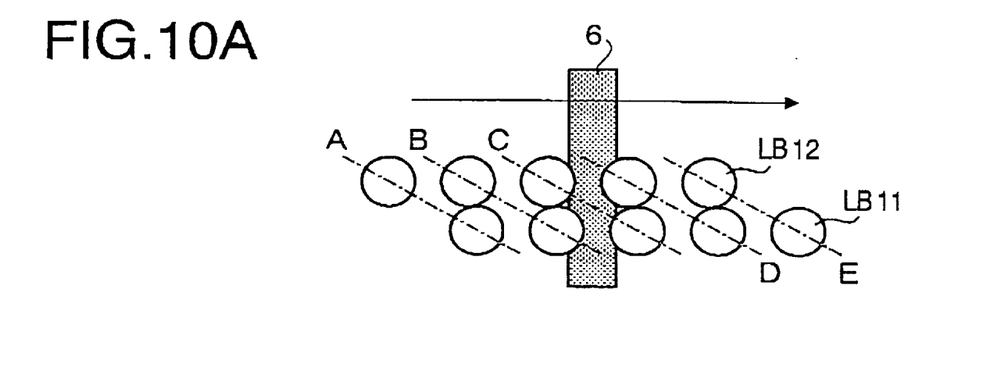
FIGS. 10A, 10B and 10C are drawings illustrating a problem of a conventional beam detecting method for a multi-beam scanning device when a distance between beams is relatively long.

If the beam detector as described above is used for a multi-beam scanning device, a plurality of beam spots traverse the light receiving surface of the beam detector 6 as shown in FIG. 10A. In FIG. 10A, two beam spots LB11 and LB12 scan on the beam detector 6. The beam detector 6 outputs the voltage VO which represents synthesized signals corresponding to the beam spots LB11 and LB12. Generally, in a multi-beam scanning device, the beam spots are aligned along a line that is inclined with respect to the main scanning direction.

Figure 10B:
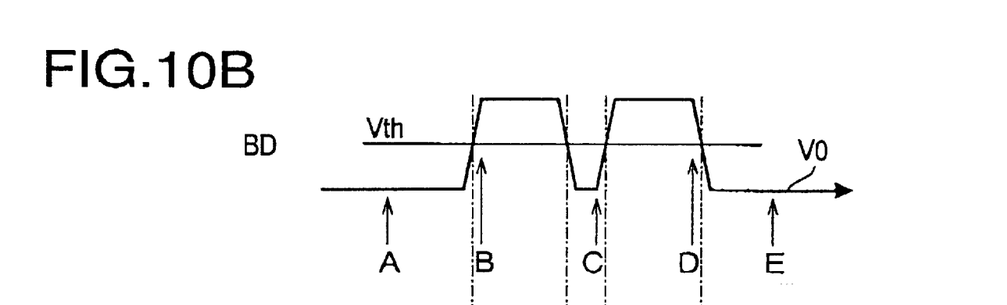
Figure 10C:
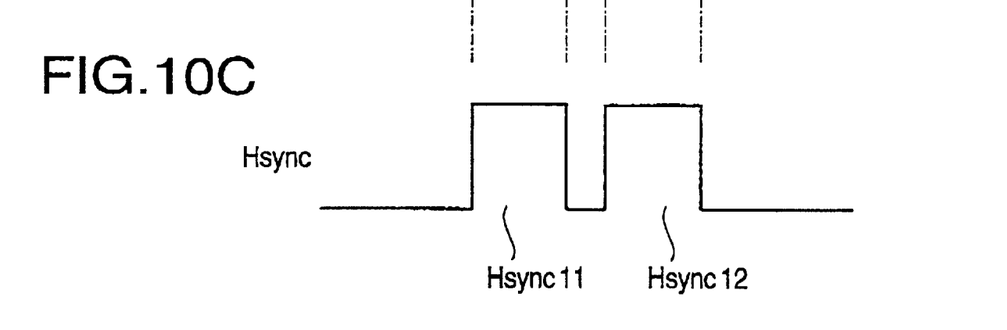

If the distance between the two beams LB11 and LB12 is sufficiently larger than width, in the main scanning direction, of the beam detector 6, there is a period during which none of the two beams LB11 and LB12 are incident on the beam detector 6. In such a case, as shown in FIG. 10B, the beam detector 6 outputs a signal VO having two distinct peaks respectively corresponds to the two beams LB11 and LB12. Thus, the output signal VO shown in FIG. 10B can be used for generating the horizontal synchronizing signals for the laser beams LB11 and LB12, respectively, as shown in FIG. 10C. It should be noted, however, the two peaks of the output signal VO have similar waveforms, and therefore, it is impossible to determine which peak corresponds to which beam. In order to generate the horizontal synchronizing signals Hsync11 and Hsync12, a circuit for distinguish the two peaks should be added.

Further, if the scanning speed is relatively fast, i.e., the scanning period is shortened, and therefore the interval between the two beams, in the main scanning direction, relative to the scanning period becomes greater, and therefore, a period of time during which the beam detector 6 detects the laser beams LB11 and LB12 becomes shorter, a response of the beam detector 6 (i.e., a photo-electric conversion speed) may not follow the scanning speed. In such a case, the peaks of the signal VO cannot be identified. That is, if the waveform of the output signal of the beam detector 6 is likened to ridge and valley portions, the valley portion becomes shallower if the scanning speed becomes faster. Thus, also in such a case, a circuit for distinguish the peaks, which results in a large size of the scanning device.

Figure 11A:
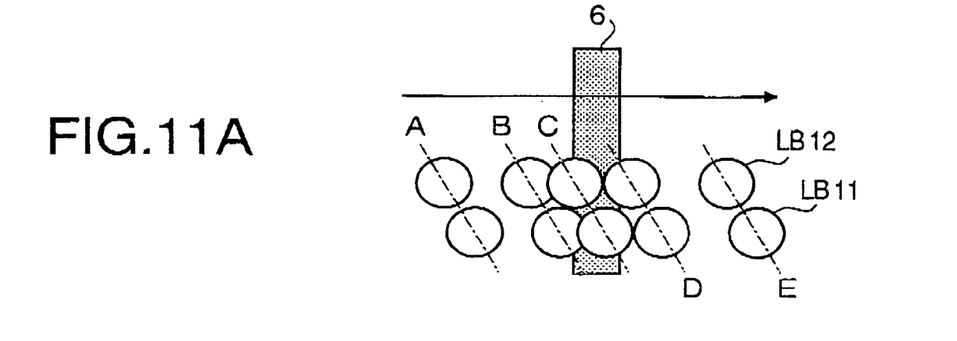
FIGS. 11A–11E are drawings illustrating a problem of a conventional beam detecting method for multi-beam scanning device when a distance between beams is relatively short.
Figure 11B:
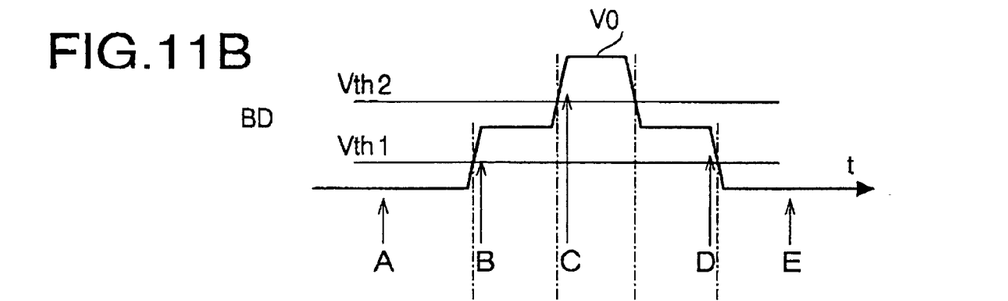
Figure 11C:
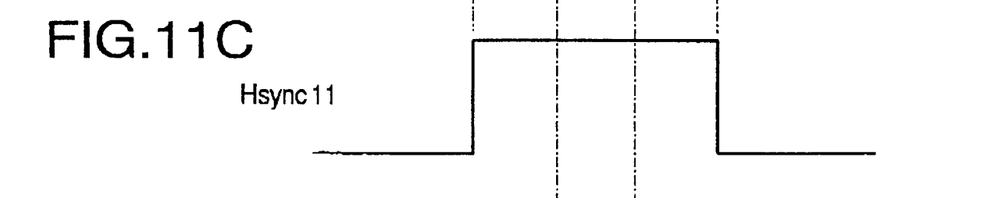
Figure 11D:
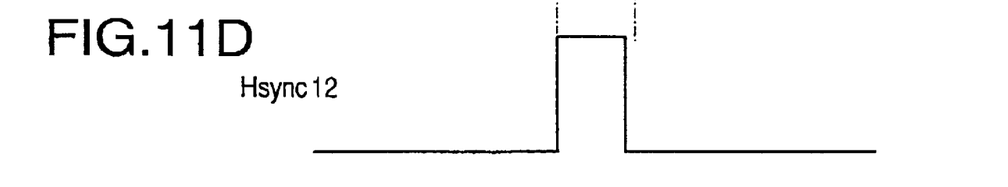

If a distance between the two beams LB11 and LB12, in the main scanning direction, is small relative to the width of the beam detector 6, as shown in FIG. 11A, the output signal VO may have waveform as shown in FIG. 11B. The output signal VO includes components corresponding to the two beams LB11 and LB12, which are overlapped (see Hsync11 and Hsync12 shown in FIGS. 11C and 11D). It is impossible to detect the horizontal synchronizing signals for the two beams LB11 and LB12 from the signal VO alone. In order to distinguish the two beams, the output signal VO is compared with two threshold values Vth1 and Vth2 as shown in FIG. 11B. In FIG. 11B, positions A–E corresponds to the beam positions shown in FIG. 11A. At position B, the beam LB11 is detected to be incident on the beam detector but the beam LB12 has not yet been incident on the beam detector 6. At position C, the second beam LB12 is detected to be incident on the beam detector 6, beam LB11 being also incident on the beam detector 6. At position D, the beam LB11 has passed the beam detector 6, and at position E, the beam LB12 has passed the beam detector 6. Thus, by comparing the output signal VO with the threshold values Vth1 and Vth2, the components can be distinguished.

Figure 11E:
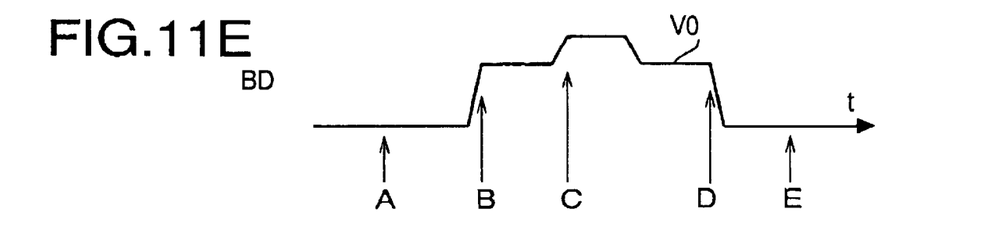

However, if the saturation level of the photodiode included in the beam detector is not set appropriately, the output VO of the beam detector 6 may have a waveform as shown in FIG. 11E. In such a case, it is difficult to distinguish the two components by comparing the output signal VO with the threshold values Vth1 and Vth2. Further, if the number of the beams is three or more, the same number of threshold values should be set, which make it more difficult to distinguish the components corresponding to the beams.

Alternatively, by providing a plurality of beam detectors respectively corresponding to the plurality of laser beams, the horizontal synchronizing signals can be detected accurately for respective beams. However, it is particularly very difficult to align a plurality of beam detectors at equivalent positions with respect to the corresponding beams. In particular, for three of more laser beams, such an alignment is practically impossible. Further, the beam detector is generally expensive, and thus, employing a plurality of beam detectors increases a manufacturing cost.

SUMMARY OF THE INVENTION

It is therefore an object of the invention to provide an improved method and device for detecting a synchronizing signal, which can be employed in a multi-beam scanning device. With the method and device, the synchronizing signal for each of a plurality of scanning beam can be detected accurately.

For the above object, according to the present invention, there is provided a method for detecting synchronizing signals of a plurality of scanning light beams in a multi-beam scanning device. The method includes modulating the plurality of light beams at predetermined different frequencies, respectively, receiving the plurality of light beams respectively modulated at different frequencies and outputting a signal representing intensity of received light beams, separating the signal representing the intensity of the received light beams into a plurality of component signals respectively corresponding to the plurality of different frequencies, and generating a plurality of synchronizing signals respectively corresponding to the plurality of light beams based on the plurality of component signals.

According to another aspect of the invention, there is provided a multi-beam scanning device, which is provided with a plurality of light sources that emit a plurality of light beams, respectively, a scanning system that deflects each of the plurality of light beams to scan within a predetermined scanning range, a modulating system that modulates the plurality of light beams at predetermined different frequencies, respectively, a beam detector positioned within the scanning range to receive the plurality of light beams respectively modulated at different frequencies, the beam detector outputting a signal representing intensity of received light beams, a separating system that separates the output signal of the beam detector, on a basis of the plurality of frequencies, into a plurality of component signals, and a synchronizing signal generating circuit that generates a plurality of synchronizing signals respectively corresponding to the plurality of light beams based on the plurality of component signals.

With this configuration, the laser beams emitted by a plurality of laser diodes are respectively modulated at different frequencies. The beam detector receives all the beams and outputs a signal representing a sum of all the components. The output of the beam detector is applied to a plurality of band pass filters corresponding to the frequencies at which the plurality of laser beams are modulated, respectively. Then, from the outputs of the band pass filters, a plurality of signals corresponding to respective frequencies are output. That is, each frequency components are separated. Once the beam detecting signals for respective laser beams are separated, the horizontal synchronizing signals can easily be obtained.

Preferably, the beam detector includes a single light receiving element capable of receiving the plurality of light beams, the beam detector outputting a sum of intensity of each of the plurality of light beams simultaneously incident on the beam detector.

In particular, the separating system may include a plurality of filters for separating the output signal output by the beam detector into the plurality of components respectively corresponding to the different frequencies, an amplifying system that adjusts a level of each of the components, and a plurality of one-shot multi vibrators respectively detects the components and generates a plurality of synchronizing signals respectively corresponds to the plurality of light beams.

Optionally, the plurality of light sources are composed of a plurality of laser diodes, respectively, and the modulating device includes an electrical current modulating device that modulates drive currents of the plurality of laser diode at the different frequencies, respectively.

Further optionally, the scanning system deflects the plurality of light beams so that beam spots formed by the plurality of light beams scan on a surface to be scanned in a main scanning direction, the beam detector is provided on optical paths of the plurality of light beams, the synchronizing signal generating system generates horizontal synchronizing signals for the plurality of light beams.

Still optionally, when an allowable jitter of a horizontal synchronizing of the plurality of light beams is defined by a following equation:

$$\Delta t = Te/n,$$

where Te is a one-dot period of the plurality of light beams scanning on a surface to be scanned, and n is an integer, then a minimum frequency fmin of the plurality of frequencies at which the modulating system modulates the plurality of light beams satisfy a following condition:

$$fmin \leq n/Te.$$

DESCRIPTION OF THE EMBODIMENT

A multi-beam scanning device according to an embodiment of the present invention will be described hereinafter with reference to the accompanying drawings.

Figure 1:
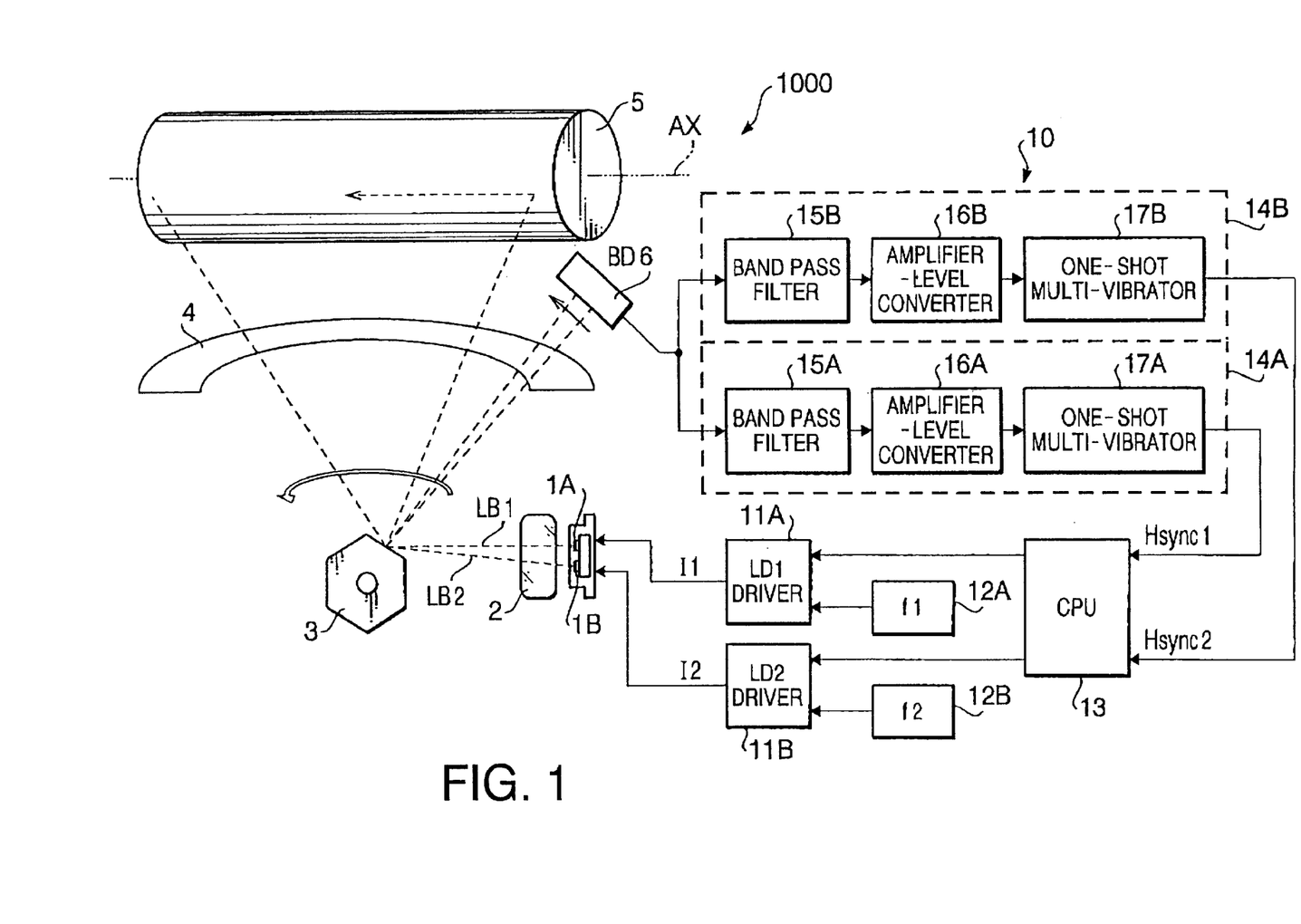
FIG. 1 shows a configuration of a multi-beam scanning device according to an embodiment of the invention.

FIG. 1 shows a configuration of a multi-beam scanning device 1000 according to an embodiment of the present invention.

The multi-beam scanning device 1000 is provided with two laser diodes 1A and 1B, which are arranged to be close to each other. Preferably, the two laser diodes 1A and 1B may be formed on the same chip such that the light emitting positions are close to each other. The laser diodes 1A and 1B are driven to emit laser beam by laser driving circuits 11A and 11B, respectively. The laser beams emitted by the laser diodes 1A and 1B are collimated by a collimating lens 2 such that the collimated laser beams LB1 and LB2 each having a very small radius. The laser beams LB1 and LB2 impinge on a polygonal mirror 3, which is rotated at a high speed. The laser beam LB1 and LB2 are deflected by the polygonal mirror 3 to scan in a horizontal direction. The deflected laser beams pass through an fθ lens 4 and incident of a photoconductive surface of a photoconductive drum 5. On the photoconductive drum 5, beam spots formed by the laser beam LB1 and LB2 move at a constant speed in a main scanning direction, which is parallel with a rotational axis of the photoconductive drum 5. With in a scanning range of the laser beam LB1 and LB2, but out of an area contributing image formation, a beam detector 6 is arranged. The beam detector 6 outputs a detection signal when each of the scanning beams LB1 and LB2 is incident on the beam detector 6. The output signal of the beam detector 6 is input to a controller 10, which detects horizontal synchronizing signals Hsync1 and Hsync2 used for driving the laser diodes 1A and 1B, respectively. The beam detector 6 is composed of a single beam detecting element such as a photo diode, as in a conventional single beam scanning device. The laser diode diving circuits 11A and 11B are provided in the controller 10.

The controller 10 is provided with first and second signal generating circuits 12A and 12B which generate first and second signals which have frequencies f1 and f2, respectively. The frequencies f1 and f2 are different. The first and second signals are transmitted to the laser diode driving circuits 11A and 11B, respectively. The laser diode driving circuits 11A and 11B are configured to output laser driving currents I1 and I2 in accordance with a control signal transmitted from the CPU 13. It should be noted that the industry of the beams output by the laser diodes 1A and 1B, and beam emitting timing thereof are adjusted in accordance with the control signal transmitted from the CPU 13. Further to the above, the laser diode drive circuits 11A and 11B modulate the laser driving currents I1 and I2 in accordance with the first and second frequencies f1 and f2, respectively. Specifically, the driving current I1 of the first laser diode 1A is modulated at the first frequency f1, and the driving current I2 for the second laser diode 2A is modulated at the second frequency f2. Thus, the first and second laser diodes 1A and 1B are driven such that the intensity of the laser beams emitted thereby change at frequencies f1 and f2, respectively.

The the CPU 13, outputs of the first and second horizontal synchronizing signal detection circuits 14A and 14B in the controller 10 are input. The horizontal synchronizing signal detection circuits 14A and 14B are respectively provided with:

first and second band pass filters 15A and 15B;
first and second amplifier-level converters 16A and 16B;
first and second one-shot multi vibrators 17A and 17B.

The first and second band pass filters 15A and 15B have central frequencies f1 and f2. The first and second amplifier-level converters 16A and 16B amplify the signals passed through the first and second band pass filters 15A and 15B and then convert into digital signals. The one-shot multi vibrators 17A and 17B maintain signals having a predetermined level for a predetermined period of time in response to the outputs of the amplifier-level converters 16A and 16B.

The output of the first one-shot multi vibrator 17A is transmitted to the CPU 13 as the first horizontal synchronizing signal Hsync1, and the output of the second one-shot multi vibrator 17B is transmitted to the CPU 13 as the second horizontal synchronizing signal Hsync2. It should be noted that the central frequencies f1 and f2 of the pass bands of the first and second band pass filters 15A and 15B are the same as the frequencies of the signals generated by the frequency signal generating circuits 12A and 12B, respectively.

Operation of the multi-beam scanning device will be described with reference to accompanying drawings, FIGS. 1–7.

During a horizontal synchronizing signal detection period within a horizontal scanning period, the first and second laser diode driving circuits 11A and 11B receive the driving data representing light emitting information of the first and second laser diodes 1A and 1B from the CPU 13 to output driving currents I1 and I2, which are modulated in accordance with the frequency signals f1 and f2 generated by the first and second frequency signal generating circuits 12A and 12B, respectively. Therefore, the driving currents I1 and I2 are direct currents on which the alternating components, whose frequencies are f1 and f2, are overlapped, respectively. It should be noted that the minimum level of the driving currents I1 and I2 are substantially the same as the threshold currents of the laser diodes 1A and 1B, respectively.

Figure 2A:
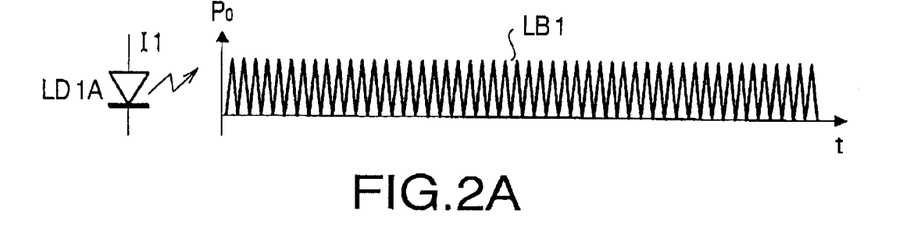
FIGS. 2A and 2B show waveforms representing output power of laser beam emitted by two laser diodes employed in the multi-beam scanning device shown in FIG. 1.
Figure 2B:
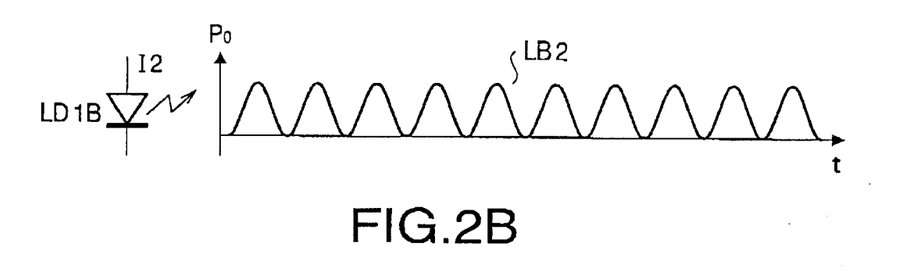

FIGS. 2A and 2B shows an example of powers of the emitted beams LB1 and LB2 output by the laser diodes 1A and 1B when driven in accordance with the driving currents I1 and I2. As shown in FIGS. 2A and 2B, the beam LB1 is modulated at the frequency of f1, and the beam LB2 is modulated at the frequency of F2. In this example, the frequency f1 is higher than the frequency f2.

The driving current I1 and I2 are expressed as follows:

$$I1 = I1th + A1 \cdot [1 + \sin(2\pi f1 \cdot t)] \quad (1)$$

$$I2 = I2th + A2 \cdot [1 + \sin(2\pi f2 \cdot t)] \quad (2)$$

where I1th and I2th are threshold currents of the first and second laser diodes 1A and 1B, t represents time.

Each drive current I1 and I2 is modulated at the frequencies f1 and f2. The laser beam emitted by the laser diodes 1A and 1B are collimated by the collimating lens 2. Therefore, the laser beams LB1 and LB2, which are modulated at the frequencies f1 and f2, are emitted.

Figure 3:
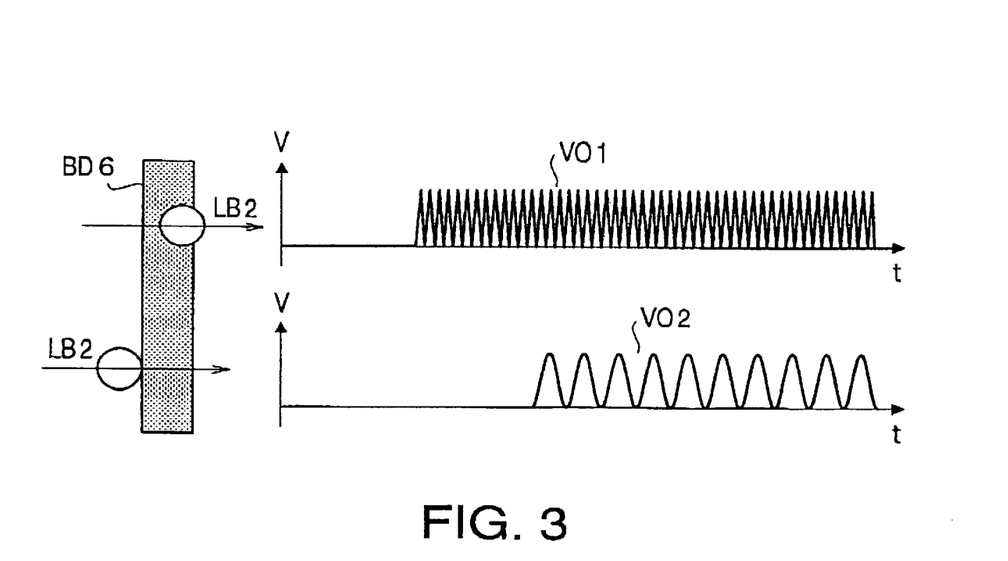
FIG. 3 shows waveforms of output signals of a beam detector employed in the multi-beam scanning device shown in FIG. 1.
Figure 4:
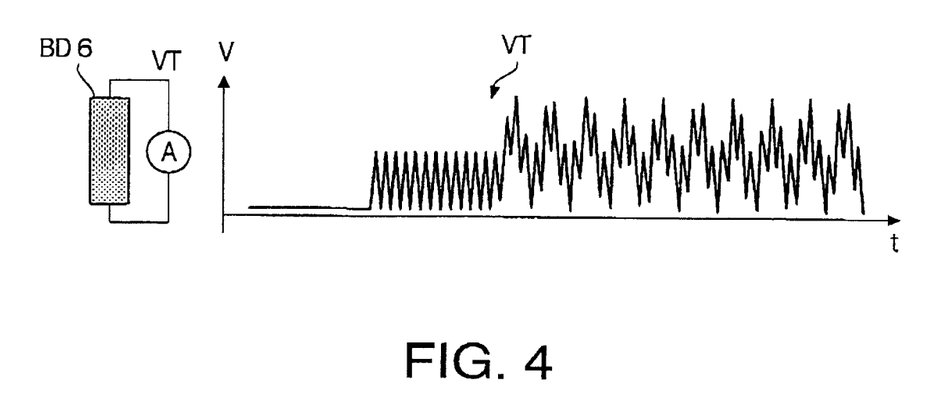
FIG. 4 shows a waveform which is generated by synthesizing the output signals of the beam detector shown in FIG. 3.
Figure 5:
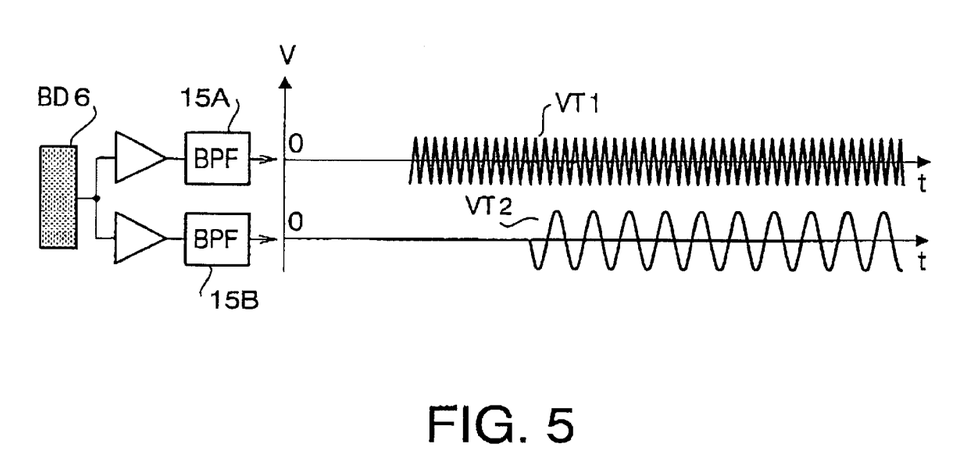
FIG. 5 shows waveforms of signals separated by a band pass filters.

The laser beams LB1 and LB2 emitted by the laser diodes 1A and 1B are deflected by the polygonal mirror 3, and scan on the photoconductive drum 5 via the fθ lens 4. At each scanning, the laser beams LB1 and LB2 are incident on the beam detector 6. Since the laser beam LB1 and LB2 are modulated at the frequencies f1 and f2, respectively, photo-electric conversion signals VO1 and VO2 of the beam detector 6 corresponding to the laser beams LB1 and LB2 have waveforms as shown in FIG. 3, respectively. Therefore, the output signal VT output by the beam detector 6 has a waveform as shown in FIG. 4, which is a synthesized signal of the signals VO1 and VO2. The output signal VT is input to the first and second band-pass filters 15A and 15B. Central frequencies of the band-pass filters 15A and 15B are equal to the frequencies f1 and f2, respectively, and passing ranges of the band-pass filters 15A and 15B do not substantially overlap. It should be noted that, the wavelength ranges the band-pass filters 15A and 15B allow to pass may be slightly overlap if the passable wavelength ranges are sufficiently exclusive. Accordingly, from the band-pass filters 15A and 15B, the signals VT1 and VT 2 having the frequencies f1 and f2 are output as shown in FIG. 5.

Figure 6:
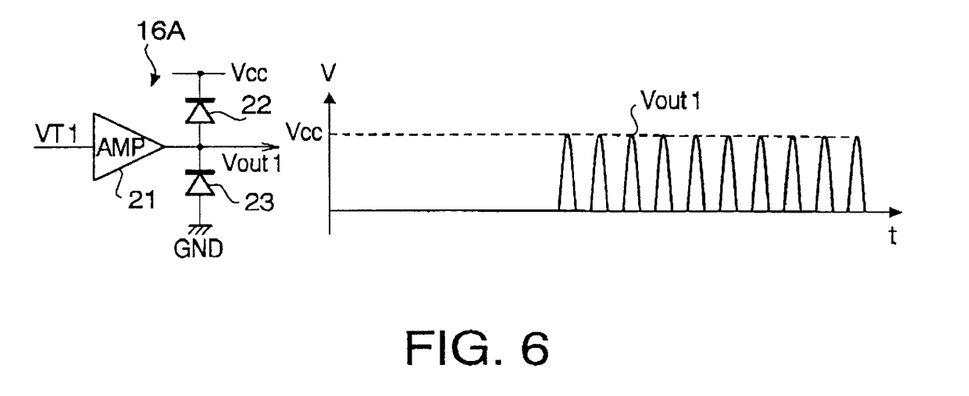
FIG. 6 shows a waveform of one of the separated signals.
Figure 7:
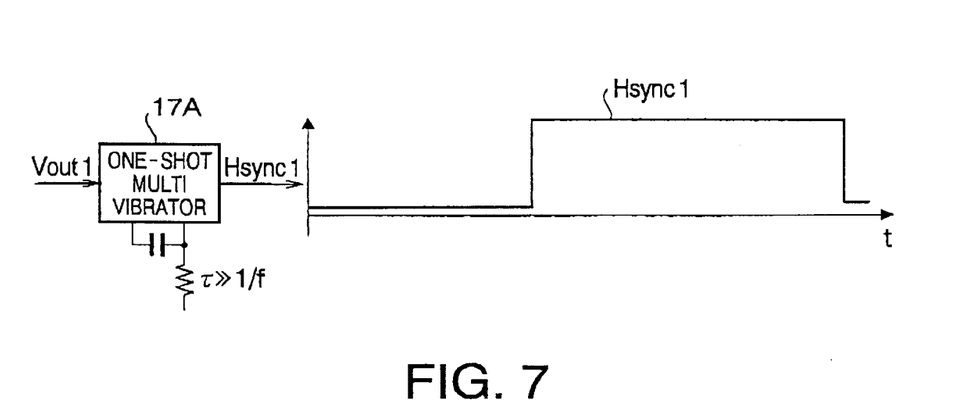
FIG. 7 shows a waveform of a horizontal synchronizing signal that is generated based on the signal shown in FIG. 6.

FIG. 6 shows an amplifying and level converting circuit 16A. The amplifying and level converting circuit 16A includes an amplifier 21 and a limiter circuit including a diode 22 connected between voltage source Vcc and the output terminal of the amplifier 21 and another diode 23 connected between ground and the output terminal of the amplifier 21.

The output signal VT1 of the band-pass filter 15A is amplified by the amplifier 21, then the level of the amplified signal is clipped by the limiter circuit so that the signal oscillates within a range between Vcc and ground level (0 volt), the converted signal Vout1 is shown in FIG. 6. The converted signal Vout1 is input to the one-shot multi vibrator 17A. Then, the multi vibrator 17A outputs a high level signal, which is generated in response to the first oscillation of the converted signal Vout1. The high level signal output by the multi vibrator 17A is used as the first horizontal synchronizing signal Hsync1. It should be noted that a time constant of the multi vibrator 17A is configured such that the high level signal lasts during a period within which the beam spot traverses the beam detector, or slightly longer.

The detection signal output by the second band pass filter 15B is processed in a similar manner, and the second horizontal synchronizing signal Hsync2 is output by the multi vibrator 17B. Thus, the first and second horizontal synchronizing signals Hsync 1 and Hsync2 are obtained independently from each other.

As in a conventional scanning device, after the horizontal synchronizing signals Hsync1 and Hsync2 are output, and a predetermined period has elapsed, image formation period starts. That is, the laser beams LB1 and LB2 are driven by the laser diode drive circuits 11A and 11B, which receive pulse signals modulated in accordance with image data transmitted from the CPU 13.

As described above, the laser beams emitted by a plurality of laser diodes are respectively modulated at different frequencies. The beam detector receives all the beams and outputs a signal representing a sum of all the components. The output of the beam detector is applied to a plurality of band pass filters corresponding to the frequencies at which the laser beams are modulated. Then, from the band pass filters, a plurality of signals corresponding to respective frequencies are output. That is, each frequency components are separated. Once the beam detecting signals for respective laser beams are separated, the horizontal synchronizing signals can easily be obtained. With this configuration, each synchronizing signal is not interfered by the other signals. Thus, according to the above-described embodiment, a plurality of horizontal synchronizing signals for a plurality of laser beams can be detected with a single beam detector. Accordingly, the number of elements of the multi-beam scanning device can be reduced considerably, which contributes to lowering of the manufacturing cost.

It should be noted that, even if the signal VT output by the beam detector (see FIG. 4) includes a direct current component, it is eliminated by the band pass filters 15A and 15B. Therefore, in equation (1) and (2), the first terms of the right side thereof (i.e., I1th and I2th) can be replaced with any currents greater than the household currents and not greater than the currents for appropriate operation of the laser diodes, respectively.

Figure 8A:
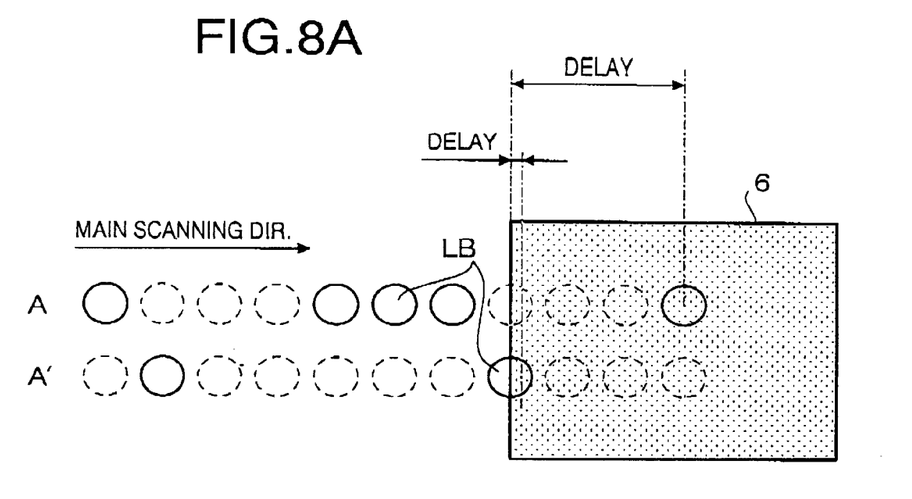
FIGS. 8A and 8B show relationships between jitter and modulated frequency.
Figure 8B:
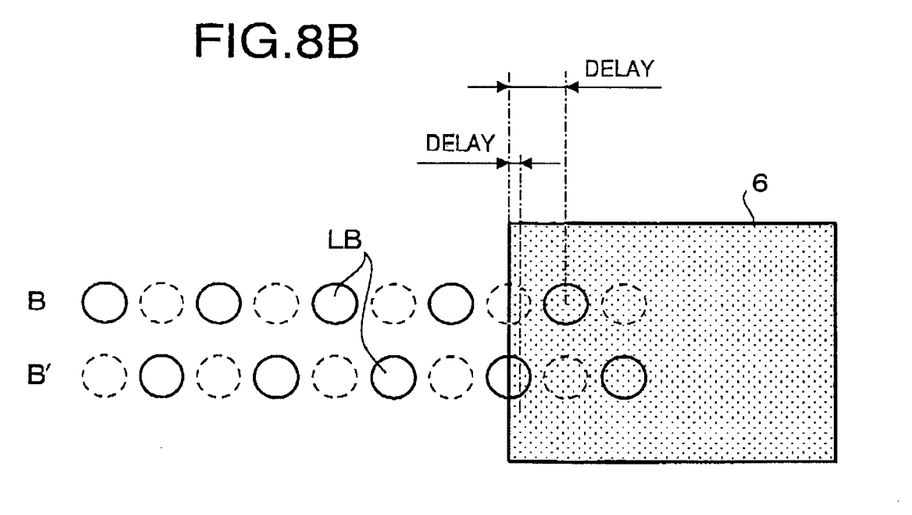

FIGS. 8A and 8B show beam spots at various positions adjacent to the beam detector 6.

If a relationship between a phase of the modulated beam and a timing at which the beam spot is incident on the beam detector varies during a plurality of scanning operations, a jitter may occur.

In FIG. 8A, circles drawn by solid lines corresponds to positions of beam spots, the detection signal of which would be used for triggering the multi vibrator (see FIG. 6), and these spots will be referred to as effective spots hereinafter. Circles drawn by dotted lines represent positions of the beam spots, the detection signal of which would be clipped in the level converting process and therefore do not contribute to trigger the multi vibrator. Such spots will be referred to as an ineffective spots hereinafter.

In a scanning operation indicated by A, the beams spots turned to ineffective spots immediately before the beam spot reaches the beam detector. The succeeding beam spots are ineffective, and the next effective beam spots appears at about the central portion of the beam detector 6. In another scanning operation indicated by A', the beam spots turned to effective when the beam spot has reached the beam detector 6. Ideally, the beam detector 6 detects the leading edge of the beam spot. However, since the laser beam is modulated, the beam spot is detected in manner described above. Assuming that the beam detector detects the center of the beam spot, in case A above, detection of the beam spot by the beam detector delays by a relatively long period in comparison with the ideal case. In case A' above, the delay is relatively short. If the detection of the beam spot varies in a manner described above, the image of scanning lines. Such an unstable condition is referred to as a jittering.

FIG. 8B shows a case similar to FIG. 8A except that the frequency of the modulation of the beam is higher in FIG. 8B than in FIG. 8A.

It is understood by comparing FIG. 8A and FIG. 8B that, the jittering would be less in the scanning operations B and B', in which the modulating frequencies are higher than in the scanning operations A and A'. That is, by using a higher frequency for modulating the laser beams, the jittering can be suppressed more effectively. According to the results of an experiment performed by the inventor of the present invention, an allowable jittering Δt should satisfy condition (3) indicated below:

$$\Delta t = Te/3 \tag{3}$$

where, Te represent a one dot period, which is a unit of imaging utilizing a laser beam and is represented by a function of a resolution and scanning speed. When condition (3) is to be satisfied, a vertical line, which is a straight line extending in the auxiliary scanning direction, should not curve to excess a range of one-third of a diameter of one dot of the image. Therefore, in order to satisfy condition (3), the minimum frequency fmin for modulating the laser beam is given by equation (4) below.

$$fmin \leq 3/Te \tag{4}$$

In the embodiment described above, the invention is applied to a multi-beam scanning device using two laser beams. However, the invention is not limited to such a configuration, and is applicable to a scanning device utilizing three or more laser beams. It is apparent from the above description, for a person skilled in the art, that, in a scanning device utilizing a plurality of laser beams, the beams are modulated at different frequencies, and on the output side of the beam detector, the band pass filters respectively corresponding to the modulating frequencies, and amplifier-converter circuits respectively processing the signals output by the band pass filters are to be provided. In this case, the band pass filters for the lowest frequency and highest frequency can be replaced with low-pass filter and high-pass filter, respectively.

As described above, the laser beams emitted by a plurality of laser diodes are respectively modulated at different frequencies. The beam detector receives all the beams and outputs a signal representing a sum of all the components. The output of the beam detector is applied to a plurality of band pass filters corresponding to the frequencies at which the plurality of laser beams are modulated, respectively. Then, from the band pass filters, a plurality of signals corresponding to respective frequencies are output. That is, each frequency components are separated. Once the beam detecting signals for respective laser beams are separated, the horizontal synchronizing signals can easily be obtained. With this configuration, each synchronizing signal is not interfered by the other signals. Thus, according to the present invention, a plurality of horizontal synchronizing signals for a plurality of laser beams can be detected with a single beam detector. Accordingly, the number of elements of the multi-beam scanning device can be reduced considerably, which contribute to lowering of the manufacturing cost.

The present disclosure relates to the subject matter contained in Japanese Patent Application No. HEI 11-214673, filed on Jul. 29, 1999, which is expressly incorporated herein by reference in its entirety.

What is claimed is:

1. A method for detecting synchronizing signals of a plurality of scanning light beams in a multi-beam scanning device, said method comprising:

modulating said plurality of scanning light beams at a plurality of different frequencies, respectively;

receiving said plurality of scanning light beams respectively modulated at said plurality of different frequencies and outputting a signal representing intensity of received light beams;

separating the signal representing the intensity of the received light beams into a plurality of component signals respectively corresponding to said plurality of different frequencies; and generating a plurality of synchronizing signals respectively corresponding to said plurality of light beams based on said plurality of component signals.

2. A multi-beam scanning device, comprising:

a plurality of light sources that emit a plurality of light beams, respectively;

a scanning system that deflects each of said plurality of light beams to scan within a predetermined scanning range;

a modulating system that modulates said plurality of light beams at a plurality of different frequencies, respectively;

a beam detector positioned within said scanning range to receive said plurality of light beams respectively modulated at said plurality of different frequencies, said beam detector outputting a signal representing intensity of received light beams;

a separating system that separates the output signal of said beam detector, on a basis of said plurality of different frequencies, into a plurality of component signals; and a synchronizing signal generating circuit that generates a plurality of synchronizing signals respectively corresponding to said plurality of light beams based on said plurality of component signals.

3. The multi-beam scanning device according to claim 2, wherein said beam detector includes a single light receiving element capable of receiving said plurality of light beams, said beam detector outputting a sum of intensity of each of said plurality of light beams simultaneously incident on said beam detector.

4. The multi-beam scanning device according to claim 2, wherein said separating system includes a plurality of filters for separating and output signal output by said beam detector into said plurality of component signals respectively corresponding to said different frequencies.

5. The multi-beam scanning device according to claim 4, wherein said synchronizing signal generating circuit includes:

an amplifying system that adjusts a level of each of said component signals; and a plurality of one-shot multi vibrators that respectively detect said component signals and generate a plurality of synchronizing signals respectively corresponding to said plurality of light beams.

6. The multi-beam scanning device according to claim 2, wherein said plurality of light sources are composed of a plurality of laser diodes, respectively, and wherein said modulating system includes an electrical current modulating device that modulates drive currents of said plurality of laser diodes at said different frequencies, respectively.

7. The multi-beam scanning device according to claim 2, wherein said scanning system deflects said plurality of light beams so that beam spots formed by said plurality of light beams scan on a surface to be scanned in a main scanning direction, wherein said beam detector is provided on optical paths of said plurality of light beams, and wherein said synchronizing signal generating circuit generates horizontal synchronizing signals for said plurality of light beams.

8. The multi-beam scanning device according to claim 2, wherein, when an allowable jitter of a horizontal synchronizing of said plurality of light beams is defined by a following equation:

$$\Delta t + Te/n,$$

where Te is a one-dot period of said plurality of light beams scanning on a surface to be scanned, and n is an integer, then a minimum frequency fmin of said plurality of frequencies at which said modulating system modulates said plurality of light beams satisfy a following condition:

$$fmin \leq n/Te.$$

9. The multi-beam scanning device according to claim 2, wherein said modulating system modulates each of said plurality of scanning light beams with a sine wave signal corresponding to one of said plurality of frequencies.

10. The multi-beam scanning device according to claim 2, further comprising a plurality of driving circuits that output driving currents to said modulating system as follows:

$$I1 = I1(th) + A1 \cdot [1 + \sin(2\pi f1 \cdot t)], \text{ and}$$

$$I2 = I2(th) + A2 \cdot [1 + \sin(2\pi f2 \cdot t)]$$

where I1(th) and I2(th) are a first and second minimum (threshold) output current of corresponding first and second driving circuits.

* * * * *